Feb. 6, 1973   C. JONES   3,715,178

DOWELING CONSTRUCTION FOR ROTARY ENGINE HOUSING

Filed Nov. 30, 1971   2 Sheets-Sheet 1

INVENTOR.
CHARLES JONES
BY Raymond P. Wallace

AGENT

INVENTOR.
CHARLES JONES
BY Raymond P. Wallace
AGENT

United States Patent Office 3,715,178
Patented Feb. 6, 1973

3,715,178
DOWELING CONSTRUCTION FOR ROTARY
ENGINE HOUSING
Charles Jones, Hillsdale, N.J., assignor to Curtiss-
Wright Corporation, Wood-Ridge, N.J.
Filed Nov. 30, 1971, Ser. No. 203,279
Int. Cl. F01c 21/06; F04c 29/04; F02b 55/10
U.S. Cl. 418—83       5 Claims

ABSTRACT OF THE DISCLOSURE

A rotary engine housing having a locating and positioning dowel structure, comprising a plurality of hollow, liquid cooled dowel members with coaxial tie bolts, the dowel members having their ends rigidly supported and being supported at other stress points generated by thermal movement and high pressure, in such a manner that deflections and distortions are obviated.

BACKGROUND OF THE INVENTION

This invention relates to rotary engines, and more particularly to means for assembling the engine housing and maintaining its shape and dimensions at critical points. Such an engine is shown in U.S. Pat. No. 3,007,460 and has a peripheral rotor housing and a pair of parallel side walls, with axially extending coolant passages distributed around the circumference of the peripheral housing and mating with coolant passages in the side walls. The parts of the engine housing are held together by tie bolts passing through certain of the coolant passages of the peripheral shell and through the side walls. For the purpose of locating the side walls with respect to the peripheral shell, stub dowels protrude axially from each end of the peripheral housing, on which dowels the side walls are located.

In U.S. Pat. No. 3,269,372 an improved construction is shown, wherein there are provided hollow dowels running in the axial direction entirely through certain coolant passages of the peripheral housing and protruding from the ends thereof, the side walls again being seated on the dowel ends which extend a short distance into recesses in the side walls. These dowels are each supported by a boss disposed at each axial end of the peripheral housing, and are hollow so that a tie bolt extends through the tubular dowel, there being sufficient clearance between the bolt and the inner diameter of the dowel to allow passage of cooling liquid.

With the development of rotary engines of increased size, power, and performance, it has been found that the augmented gas pressures and heat flux can cause deflections in such a doweling arrangement, with concomitant distortions and displacement of portions of the housing structure. The present invention overcomes these problems of the prior art.

SUMMARY

The present invention provides a hollow dowel structure for a rotary engine of higher power achieved by increasing its axial extent and rotor width, with accompanying higher gas loads and thermal flux. The improved dowel structure provides firm support for each dowel in at least three places in the peripheral housing, particularly at the region of greatest flexure of the previous dowels, and also provides that the tubular dowel extends entirely through the side walls with support in two places therein instead of the former single place, to better distribute the stress load in the dowel member.

It is therefore an object of this invention to provide an improved construction for the housing of a rotary engine.

It is another object to provide an improved doweling arrangement for locating and positioning the members of such a housing.

A further object is to provide a doweling arrangement wherein the dowels are not subject to flexure and distortion under high gas loads and thermal flux.

Other objects and advantages will become apparent on reading the following specification in connection with the accompanying drawings.

DESCRIPTION OF THE PREFERRED EMBODIMENT

Figure 1:
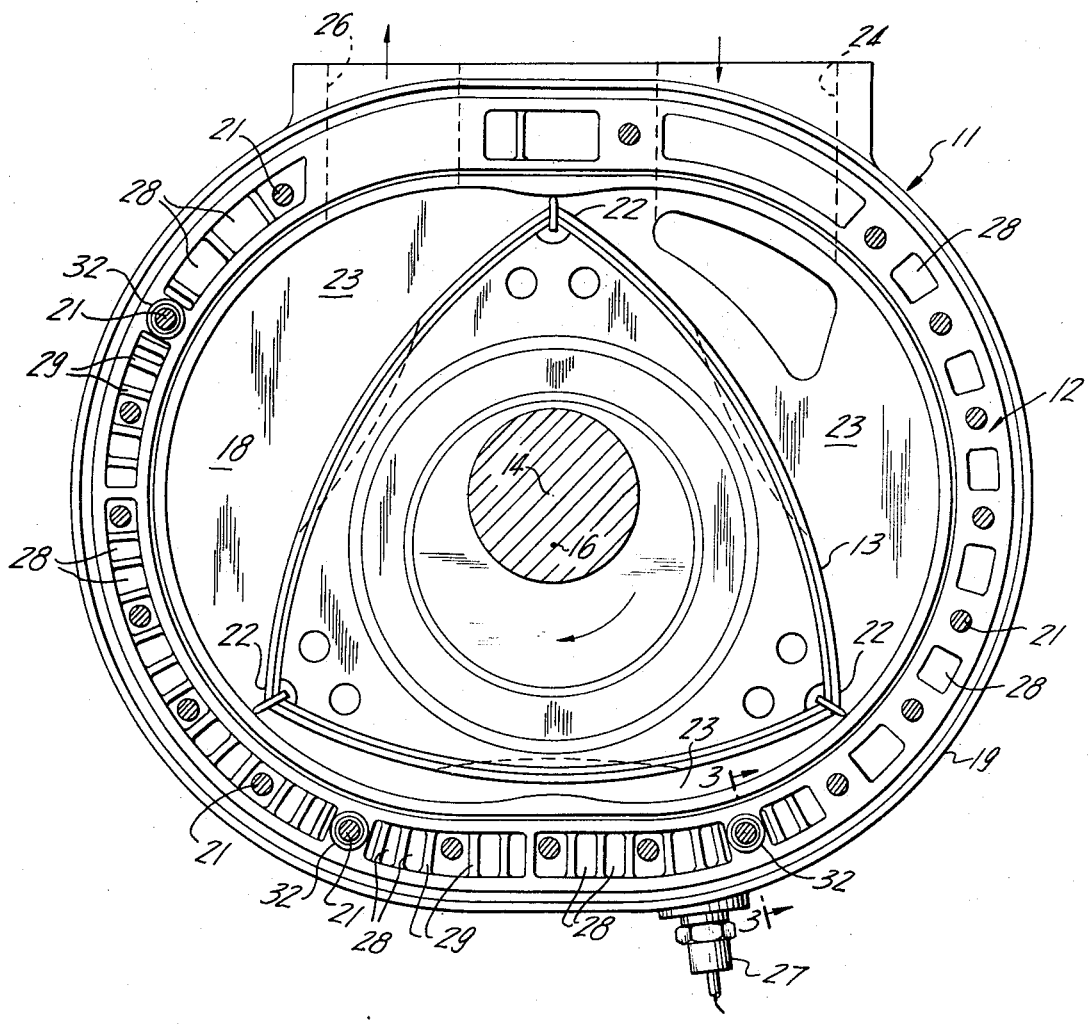
FIG. 1 is an axial view of a rotary engine with one side wall removed.

In FIG. 1 a rotary internal combustion engine is indicated generally by reference numeral 11. The engine comprises a multi-part outer body or housing 12 having a cavity within which an inner body or rotor 13 is received, the two bodies being relatively rotatable and having laterally spaced parallel axes 14 and 16 respectively. The multi-part outer body or housing 12 comprises a pair of axially spaced side walls 17 and 18, of which only the rearmost wall 18 is shown in this view, and a peripheral wall 19 interconnecting the end walls to define the internal engine cavity. The walls 17, 18, and 19 are secured together by bolts 21. As will be explained in greater detail below, the interconnection of the end walls 17 and 18 with the peripheral wall 19, particularly in the combustion zone of the engine, involves a critical relationship between the housing elements and the means for securing them together. In a plane normal to its axis 14 the engine cavity has a multilobed profile which is basically epitrochoidal. In the specific embodiment illustrated the outer body 12 has two lobes, although in other epitrochoidal figures it may have any number of lobes.

The inner body 13 has apex portions 22, one more in number than the number of outer body lobes, so that in the embodiment illustrated the rotor has three apexes and a generally triangular profile. The rotor or inner body thus forms with the housing a plurality of working chambers 23 which vary in volume upon relative rotation of the inner and outer bodies.

An intake passage 24 is provided, in the side wall 18 as shown but it may also be through the peripheral wall 19. An exhaust passage 26 is also provided, and may be through either a side wall or the peripheral wall. One or more spark plugs 27 are provided in peripheral wall 19 on the side of the outer body opposite to the intake and exhaust passages, and in the region of the lobe junction.

During engine operation the working chambers 23 have a cycle of operation including the four phases of intake, compression, expansion, and exhaust. However, the various phases of the cycle each occur always in the same portion of the outer body 12. With the rotor in the position shown in FIG. 1, the lower working chamber 23 is approximately in position for initiation of combustion by the spark plug 27. Likewise, the intake port 24 and the exhaust port 26 each serve each working chamber 23, and these ports are on the side of the housing opposite to the spark plug. It will be apparent, therefore, that as the engine operates the rate of heat input or rejection to the outer body is not uniform all around, and instead is greatest on the side adjacent to the spark plug. Also, it will be apparent that the stresses resulting from combustion will be greatest in this region and will result in great strain on the outer body. It may therefore be seen that the cooling requirements and stress limitations of the outer body 12 vary considerably about its perimeter. In the embodiment illustrated a liquid coolant such as water is circulated through passages in the outer body for the purpose of adequately cooling them so as to minimize variations in temperature around the periphery.

The peripheral wall 19 is generally hollow, and is provided with a plurality of axially extending coolant passages 28 distributed around the periphery, separated from each other by ribs 29, there being a greater number of such passages in the combustion and expansion regions than elsewhere. Passages 28 in the peripheral wall 19 mate with other appropriately disposed passages 31 (shown in FIG. 3) in the side walls 17 and 18, whereby a flow of coolant can be established through the housing, the flow being greatest at the region of highest heat input.

In order to maintain alignment between the side walls 17 and 18 and the peripheral wall 19 during operation, while the outer body is being subjected to substantial thermal and gas pressure loads, there is provided a dowel pin structure. A dowel structure as used in the prior art is shown in FIG. 2, and following is an explanation of why it will not serve in engines of increased size and power and hence greater heat flux and gas load.

Figure 2:
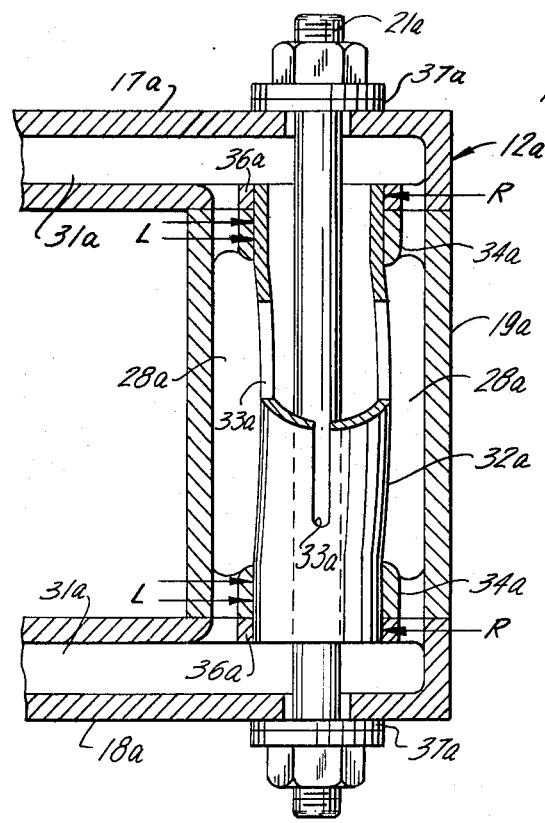
FIG. 2 is a fragmentary view showing the doweling arrangement of the prior art.

FIG. 2 is a fragmentary view showing a portion of an outer body 12a comprising a pair of parallel side walls 17a and 18a and a peripheral wall 19a. A hollow dowel member 32a is disposed in one of the coolant passages 28a, with a tie bolt 21a coaxially disposed in the tubular dowel and extending through the side walls. The tubular dowels have their ends open to the water passages 31a in the side walls, and are also provided with apertures 33a, so that a flow of coolant through the dowel is assured, to keep the tie bolt cool. A boss 34a is positioned within the passage 28a at each end thereof, supported by ribs extending from the inner surface of the passage, and having a bore for the dowel to pass through.

The side walls in the region of their coolant passages have a double thickness, that is, an inner wall portion and an outer wall portion separated by the coolant passage. In the prior art arrangement shown in FIG. 2 the end of the dowel is supported only in the inner portion of the side wall, by a boss 36a positioned in the side wall passage 31a, the axially outermost surface of boss 36a and the end of the dowel tube being approximately flush with the inner surface of passage 31a, leaving space for coolant to enter and leave the open ends of the dowel tube. Bosses 36a are supported by ribs extending from the interior surface of the passage 31a, which leaves sufficient space around the boss for the side wall passage to communicate with its mating peripheral wall passage 28, and for coolant to flow around the exterior of the dowel tube.

Gas pressure and thermal loads in the peripheral housing are transmitted to the dowels, as shown by the arrows L, at the points where the dowels are positioned in bosses 34a of the peripheral wall, and such loads are resisted by the bosses 36a in the side walls which restrain the ends of the dowels, as shown by arrows R. It will be understood that although the load arrows L show force exerted radially outwardly as for gas pressure, loads may also be exerted in other directions from differential thermal growth arising from thermal gradients.

In rotary engines of the approximate power for which the foregoing arrangement of FIG. 2 was devised, the system operated satisfactorily and the housing retained its precision shape and dimensions, without dowel failure. However, with a considerable increase in engine power, such as would be obtained by an increase of rotor width of approximately 50%, and hence a corresponding increase in the axial extent of the peripheral wall and of the dowel length, the arrangement was no longer adequate. Distortion and flexure of the dowel took place, as shown (much exaggerated) in FIG. 2. The loads applied by such high-powered engines caused bending of the dowel, with a consequent shift in the positioning of the housing parts with respect to each other, and a resulting loss in sealing effectivity and overall efficiency of the engine.

The repeated stressing of the dowel system shown in FIG. 2 can cause failure by at least two modes. The dowel itself may fail in its midportion owing to fatigue from recurrent bending stress. More commonly, however, the center deflections cause "working" of the dowel ends in their mounts, which eventually results in enlargement of the holes and loss of critical positioning and restraint.

Figure 4:
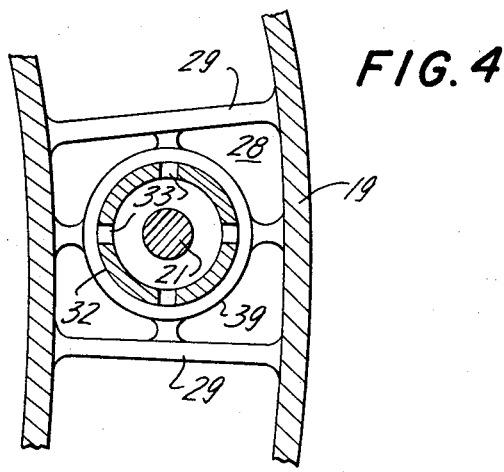
FIG. 4 is a cross-section taken along line 4—4 of FIG. 3.
Figure 3:
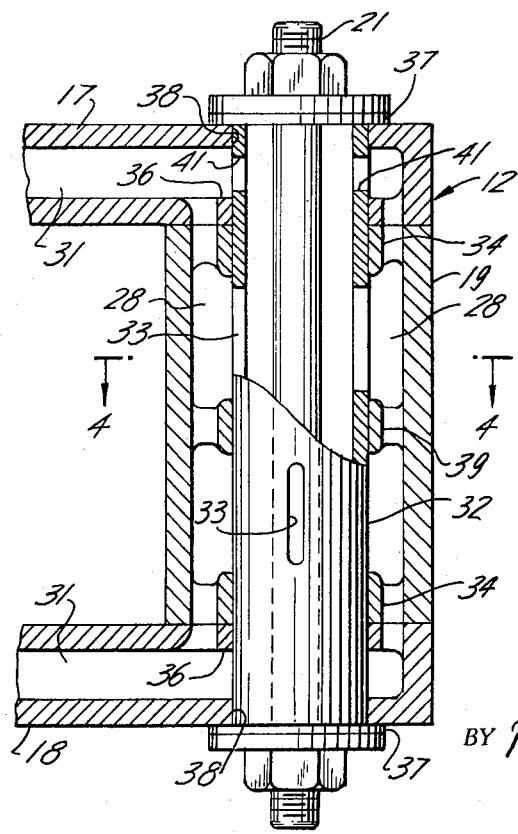
FIG. 3 is a similar view taken on line 3—3 of FIG. 1, showing the improved doweling arrangement of this invention.

To remedy this condition there has been developed the improved doweling system of the present invention shown in FIGS. 3 and 4. FIG. 3 is a fragmentary view similar to FIG. 2 showing a portion of an outer body 12 comprising a pair of parallel side walls 17 and 18 and a peripheral wall 19. A hollow dowel member 32 is positioned in a coolant passage 28, with a tie bolt 21 extending coaxially therethrough and through the side walls. However, the dowel is in this case long enough to extend not only through the axial length of the peripheral wall and into the inner portion of each side wall, but also across passage 31 and through the outer portion of each side wall. The ends of the dowel are nearly flush with the exterior surface of the side walls but a few thousandths of an inch short thereof, lying sufficiently below the surface that the clamping pressure of the tie bolt 21 will not be exerted on the dowel ends. There is provided a gasket 37 under the washer at the bolt head at each end of the dowel so that coolant will not escape. As shown in FIG. 3 the exterior surface of the side wall is spot-faced under the bolt head to provide a smooth flat for the gasket and washer, but if desired, particularly in cases wherein the outer portion of the side wall is then, there may be provided an exterior axially protruding boss.

The dowel is supported as before by a boss 34 at each end of the passage 28 and by a boss 36 in the inner portion of the side walls, these two bosses having smooth mating faces so that when the side walls and peripheral wall are assembled the bosses are abutted against each other. The outermost ends of the dowel are also supported in a tight-fitting bore 38 in the exterior portion of each of the hollow side walls.

The center portion of the dowel is supported by at least one boss 39 positioned in the coolant passage 28 of the peripheral wall between the end bosses 34. If only one boss 39 is used it is disposed approximately midway between the end bosses, but in the case of an engine of extreme axial dimension it is desirable to have a plurality of such central bosses appropriately spaced. All the bosses are bored coaxially with bores 38 to precision diameter only a fraction of a thousandth of an inch larger than the outer diameter of the tubular dowel, so that the dowel fits therein with substantially no play. The sides of the dowel tube are provided with apertures 33 between supporting bosses as before, but since the ends are no longer open for coolant flow there are also provided apertures 41 in the wall of the tube near its ends, in such a position as to communicate with passages 31 in the side walls. FIG. 4 is a cross-section along line 4—4 of FIG. 3, showing how the central boss 39 is supported on webs or ribs extending from the inner surface of passage 28.

The dowl of the prior art shown in FIG. 2 comprises essentially a simple beam, that is, a beam supported at both ends. In the dowel arrangement of the present invention as particularly shown in FIG. 3, the dowel is held in two places in the side wall relatively close together, separated by the passage 31. This arrangement comprises a beam fixed at both ends, as distinct from mere support, and is therefore inherently a much more rigid structure. A beam fixed at both ends, or a "built-in" beam, requires a load about four times greater than a simple beam to produce the same deflection. The use of one or more additional supports 39 in the central portion of the beam prevents any deflection, and obviates dowel failure and enlargement of the bores by working of the ends of the dowel therein.

As stated above, the primary purpose of the invention is to provide a novel and improved dowel structure particularly for high performance engines. Therefore, as shown in FIG. 1, at least two such dowel structures are provided in the region of highest thermal and gas loads and greatest stress, that is, in the region of the combustion zone, and preferably three, although not limted to this number. In the case of an engine designed for diesel operation, wherein the compression load is very great, it may be desirable to provide at least one more dowel structure in the region of the compression, zone to assist in maintaining the alignment of the side walls with the peripheral wall.

What is claimed is:

1. A rotary combustion engine having an outer body comprising a peripheral wall and a pair of parallel spaced side walls forming an engine cavity, an inner body rotatably disposed within the cavity such that combustion occurs adjacent to one zone of the outer body exposing said zone to relatively higher temperatures and pressures than the remainder of the outer body whereby said zone is highly stressed, the peripheral wall having axially extending coolant passages therein and the side walls having coolant passages mating with the peripheral wall passages for flow of a liquid coolant between the side walls and the peripheral wall; wherein the improvement is a dowel structure for maintaining alignment of the side walls with the peripheral wall comprising:
   (a) at least two tubular dowels disposed in the high stress zone;
   (b) each dowel being disposed in one of the axial coolant passages of the peripheral wall and rigidly supported thereby by the peripheral wall at each axial end thereof;
   (c) each dowel extending substantially through each side wall and being rigidly supported thereby at two locations in each side wall separated by a coolant passage in the side wall;
   (d) each dowel having a tie bolt extending therethrough and through the side walls and secued at each end externally of the side walls, each dowel having a plurality of apertures through the tubular wall thereof in communication with its peripheral wall coolant passage, each dowel also having at least one aperture through the tubular wall thereof in the portion disposed between its two support locations in the side wall and communicating with the side wall coolant passage to allow coolant flow through the dowels and along the tie bolts.

2. The combination recited in claim 1, wherein each dowel is supported against deflection in at least one location between the axial ends of the peripheral wall.

3. The combination recited in claim 2, wherein the dowel support means in the peripheral wall are bosses supported by ribs extending from the inner surface of the coolant passage in the peripheral wall, the support means at the inner face of each of the side walls is a boss supported by ribs extending from the inner surface of the coolant passage in the side wall, and the support means at the outermost ends of the dowel is a bore in the outer portion of the side wall, all such bores and bosses for each dowel being coaxially precision-bored to a close fit with the outer diameter of the dowel.

4. The combination recited in claim 3, wherein the peripheral wall has one supporting boss for each dowel disposed at each axial end of the peripheral wall and one supporting boss disposed approximately midway between each such pair of end bosses, the bosses at the axial ends of the peripheral wall have plane outward faces, and the bosses at the inner surfaces of the side walls have plane inner faces abutting the peripheral wall end bosses.

5. The combination recited in claim 3, wherein there are three such dowel structures circumferentially spaced and disposed in the stress region of the engine housing.

References Cited

UNITED STATES PATENTS

| | | | |
|---|---|---|---|
| 3,007,460 | 11/1961 | Bentele et al. | 123—8.45 |
| 3,269,372 | 8/1966 | Bonner | 418—83 |

CARLTON R. CROYLE, Primary Examiner

M. KOCZO, Jr., Assistant Examiner

U.S. Cl. X.R.

123—8.01

UNITED STATES PATENT OFFICE
CERTIFICATE OF CORRECTION

Patent No. 3,715,178                    Dated  February 6, 1973

Inventor(s)   Charles Jones

It is certified that error appears in the above-identified patent and that said Letters Patent are hereby corrected as shown below:

IN THE SPECIFICATION:

Column 4, line 37, the word "then" should read --thin--.

line 65, the word "dowl" should read --dowel--.

Column 5, line 16, the comma after the word "compression" should be placed after the word "zone".

IN THE CLAIMS:

Column 5, line 38, the word "thereby" should read --therein--.

line 46, the word "secued" should read --secured--.

Signed and sealed this 3rd day of July 1973.

(SEAL)
Attest:

EDWARD M. FLETCHER, JR.              Rene Tegtmeyer
Attesting Officer                    Acting Commissioner of Patents